(12) United States Patent
Wilke

(10) Patent No.: US 6,217,028 B1
(45) Date of Patent: Apr. 17, 2001

(54) SEALING APPARATUS FOR USE WITH A ROTATABLE SHAFT EXTENDING THROUGH A VESSEL

(76) Inventor: Rudeger H. Wilke, 329 Plainfield Rd., Darien, IL (US) 60561

( * ) Notice: Subject to any disclaimer, the term of this patent is extended or adjusted under 35 U.S.C. 154(b) by 0 days.

(21) Appl. No.: 09/187,113

(22) Filed: Nov. 5, 1998

(51) Int. Cl.[7] .................................................. F16J 15/34
(52) U.S. Cl. ........................ 277/370; 277/385; 277/390
(58) Field of Search .................................... 277/358, 370, 277/377, 379, 385, 390

(56) References Cited

U.S. PATENT DOCUMENTS

| | | | |
|---|---|---|---|
| 3,072,414 | * | 1/1963 | Porges . |
| 4,215,870 | * | 8/1980 | Escue . |
| 4,219,202 | * | 8/1980 | Koch . |
| 4,423,878 | * | 1/1984 | Escue . |
| 4,575,098 | | 3/1986 | Escue . |
| 4,583,748 | * | 4/1986 | Weichenrieder, Sr. . |
| 4,625,977 | * | 12/1986 | Azibert et al. . |
| 4,906,008 | * | 3/1990 | Warner . |
| 5,403,020 | * | 4/1995 | McOnie . |
| 5,538,257 | * | 7/1996 | Sandgren . |
| 5,571,268 | * | 11/1996 | Azibert . |
| 5,716,054 | * | 2/1998 | Duffee et al. . |
| 6,120,034 | * | 9/2000 | Kowalski et al. . |

OTHER PUBLICATIONS

*Custom Shaft Seals*, MECO Systems brochure, Woodex Bearing Company, Inc., Bay Point Road, Box 37–A, Georgetown, Maine 04548. No date.

Carl Sorrell and William P. Stadig: Flexible mechanical seal stops loss of 800 lb/day of fine, abrasive powder, *Chemical Processing*, Mar. 1988.

William P. Stadig, David L. Gatling and Andrew J. Morey: Mechanical seal tolerates eccentric rotation, *Chemical Processing*, Aug. 1991.

* cited by examiner

*Primary Examiner*—Anthony Knight
*Assistant Examiner*—John L. Beres
(74) *Attorney, Agent, or Firm*—Pauley Petersen Kinne & Fejer

(57) ABSTRACT

This invention relates to a seal apparatus for providing sealing engagement between a vessel and a rotatable shaft extending through a wall of the vessel. An insert retainer is connected with respect to the vessel and around and apart from the rotatable shaft. A shaft ring is connected to the rotatable shaft and rotatably positioned within the insert retainer. An insert is biased against the shaft ring and seated at least partially within the insert retainer. A retainer assembly is connected to the insert retainer and preferably biases the insert against the shaft ring. Seals, such as O-rings, may be placed around the circumference of the insert and/or around the interior of the shaft ring to further effectuate a seal between the vessel and the rotatable shaft.

17 Claims, 4 Drawing Sheets

SEALING APPARATUS FOR USE WITH A ROTATABLE SHAFT EXTENDING THROUGH A VESSEL

BACKGROUND OF THE INVENTION

1. Field of the Invention

This invention relates to a seal assembly for providing sealing engagement between a vessel and a rotatable shaft extending through a wall of the vessel.

2. Description of Prior Art

In material processing equipment it is common that a rotatable shaft is positioned through a wall of a vessel containing material. The interface between the rotatable shaft and the vessel is often the source of leaks of the material as the rotatable shaft rotates. Mechanical, safety and efficiency problems may occur if the material contaminates the processing equipment, the material is hazardous or the material is expensive.

Stuffing boxes were often used in the prior art in an attempt to seal the area between the rotatable shaft and the vessel. A stuffing box comprises a box that is filled with dense packing or stuffing attached to the vessel around the interface between the vessel and the rotatable shaft. Such stuffing boxes are often ineffective after extended periods because the packing or stuffing begins to wear away around the rotatable shaft.

Other prior art sealing apparatuses, such as Escue, U.S. Pat. No. 4,575,098, use a series of rotatable components attached with respect to the shaft and the vessel. The Escue patent teaches an undersized collar attached to the shaft which rotates around an insert and a faceplate. The seal apparatus taught by the Escue patent involves many rotating components which may result in wear of several different components. Such wear results in frequent replacement of various components.

SUMMARY OF THE INVENTION

It is one object of this invention to provide a seal apparatus that eliminates leakage between a vessel and a rotatable shaft extending through a wall of the vessel.

It is another object of this invention to provide a seal apparatus that does not require frequent replacement of sealing members.

It is still another object of this invention to provide a seal apparatus that does not lose its seal when the rotatable shaft expands or contracts.

It is yet another object of this invention to provide a seal apparatus that occupies less space than prior art seal apparatuses.

It is another object of this invention to provide a seal apparatus having a minimum of rotating components.

It is yet another object of this invention to provide a seal apparatus wherein replacement components are easy to replace.

A seal apparatus according to this invention for providing sealing engagement between a vessel and a rotatable shaft extending through a wall of the vessel achieves the above objects and is described in more detail below.

The seal apparatus includes an insert retainer mounted to the vessel. The insert retainer preferably includes an inner diameter formed around the rotatable shaft. The inner diameter of the insert retainer is preferably substantially larger than an outer diameter of the rotatable shaft.

A shaft ring, having an inner diameter approximately equal to an outer diameter of the rotatable shaft, is mounted to the rotatable shaft and rotatably positioned within the insert retainer. The shaft ring is preferably the only rotating component in the entire seal apparatus.

An insert, having an inner face and an outer face, is positioned against the shaft ring and within the insert retainer. The insert is constructed of Teflon® or similar material and is preferably the only component in the seal apparatus requiring occasional planned replacement. The insert preferably fits snugly within the insert retainer and includes a sealing member, such as an O-ring cord, positioned between the insert and the insert retainer.

A retainer assembly biases the insert against the shaft ring to complete the seal apparatus. The retainer assembly preferably includes a bias plate positioned against the insert and a retainer plate positioned opposite the insert and adjacent the bias plate. The retainer plate is preferably connected with respect to the insert retainer and includes bias members for biasing the bias plate against the insert.

As a result of the seal assembly described herein, the vessel does not leak material through the interface between the rotatable shaft and the vessel. The seal assembly includes only one rotating component, the shaft ring, and only one component that must occasionally be replaced, the insert.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
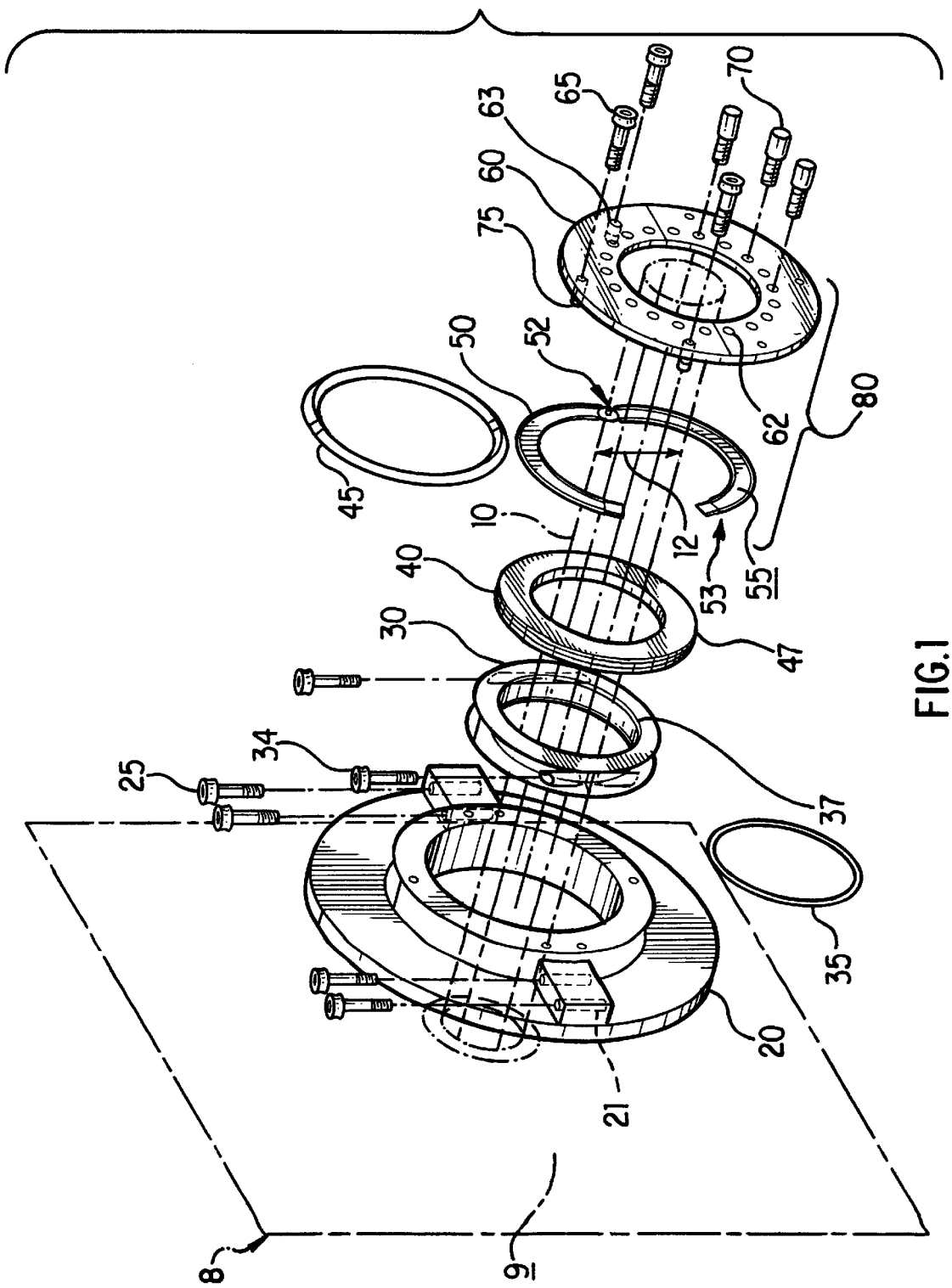
FIG. 1 is an exploded perspective view of a seal assembly according to one preferred embodiment of this invention.
Figure 2:
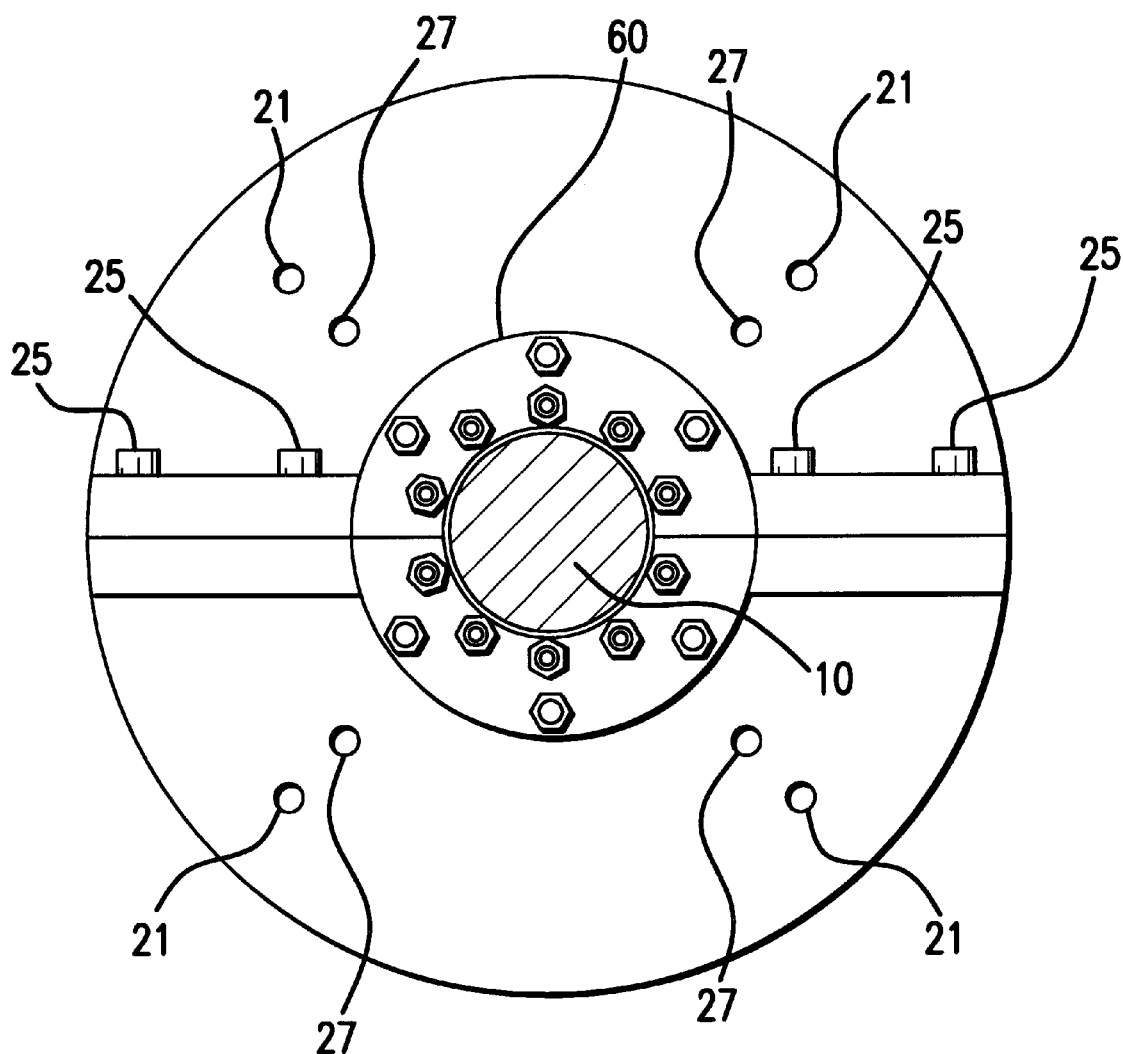
FIG. 2 is a front view of a seal assembly according to the preferred embodiment of this invention shown in FIG. 1.

FIG. 1 shows an exploded view of seal assembly 1 according to one preferred embodiment of this invention. As shown, seal assembly 1 is positioned around rotatable shaft 10 and adjacent vessel 8. Rotatable shaft 10 extends through wall 9 of vessel 8. Vessel 8 may be a mixer or other enclosure for holding and processing material that requires a rotatable shaft 10 extending through wall 9 thereof.

Without a sealing engagement between rotatable shaft 10 and vessel 8, the material within vessel 8 may gradually escape through a gap between rotatable shaft 10 and vessel 8. Such escaping material may contaminate material processing equipment or, in the case of hazardous material processing, result in a dangerous condition for workers exposed to such material processing equipment.

Accordingly, sealing assembly provides a sealing engagement between vessel 8 and rotatable shaft 10 extending through wall 9 of vessel 8. As shown in FIG. 1, seal apparatus 1 preferably includes insert retainer 20, shaft ring 30 and insert 40.

Figure 3:
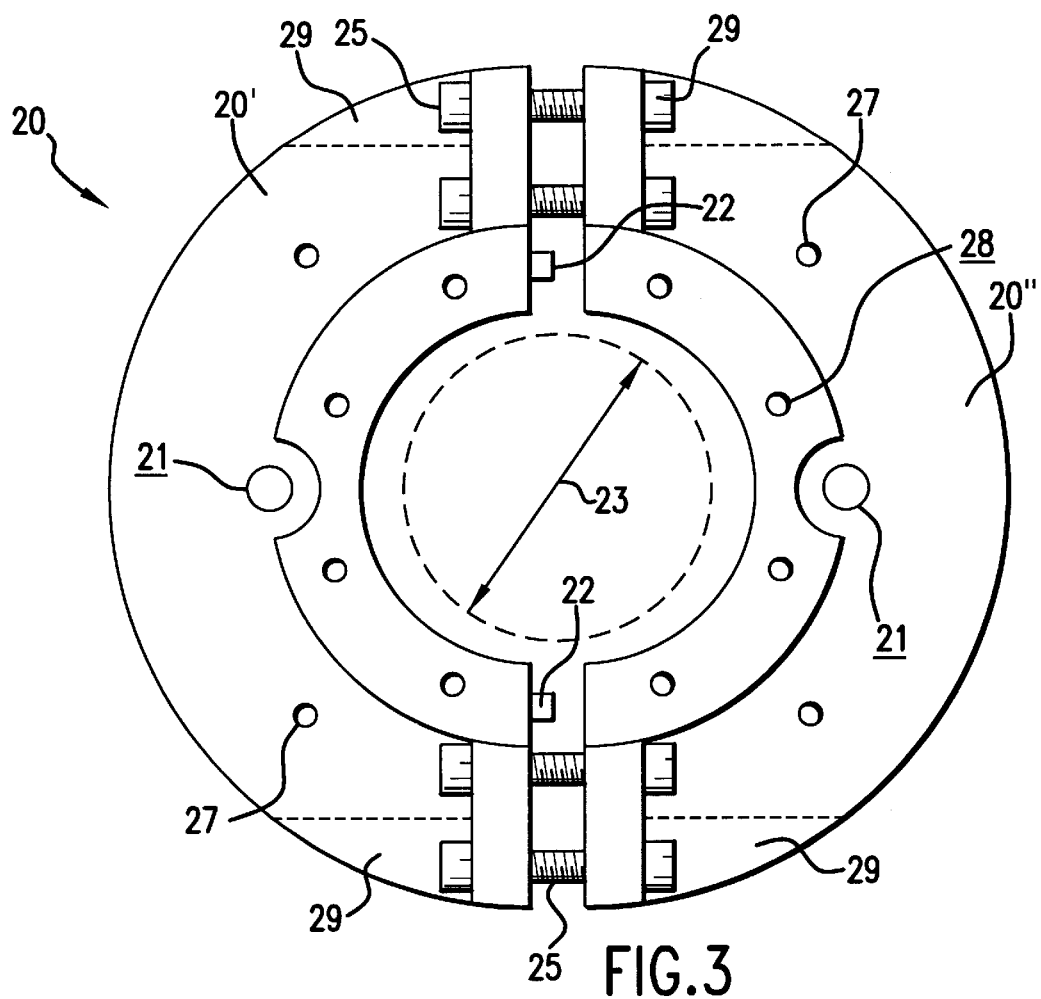
FIG. 3 is a front view of an insert retainer according to one preferred embodiment of this invention.

Insert retainer 20 is mounted or connected with respect to vessel 8 and around rotatable shaft 10. Insert retainer 20 is preferably machined from stainless steel or similar material known to those having ordinary skill in the art. As shown in FIGS. 1 and 3, insert retainer 20 is preferably separable into two insert retainer halves 20', 20". Such a configuration permits insert retainer 20 to be mounted with respect to vessel 8 without removal of rotatable shaft 10 from vessel 8. Further, seal assembly 1 according to a preferred embodiment of this invention is entirely separable to permit installation and maintenance with respect to vessel 8 without removal of rotatable shaft 10.

Insert retainer 20 is positioned with respect to vessel 8 so that outer diameter 12 of rotatable shaft 10 is freely rotatable with respect to inner diameter 23 of insert retainer 20. As shown in FIG. 3, insert retainer 20 is preferably assembled by joining two insert retainer halves 20', 20" with insert retainer screws 25 and aligning such insert retainer halves 20', 20" with alignment pins 22. Insert retainer 20 is then preferably connected with respect to vessel with fasteners and insert retainer mounting bores 21 to create a sealed engagement between insert retainer mounting bores 21 and vessel 8. In one preferred embodiment of this invention, end portions 29 of insert retainer halves 20', 20" may be removed to facilitate machining and assembly.

In addition, jack screws 27 are positioned around insert retainer 20 to facilitate squaring of insert retainer 20 with respect to vessel 8 and rotatable shaft 10. Insert retainer 20 additionally comprises retainer plate mounting bores 28 positioned around an inner perimeter of insert retainer 20.

Figure 4:
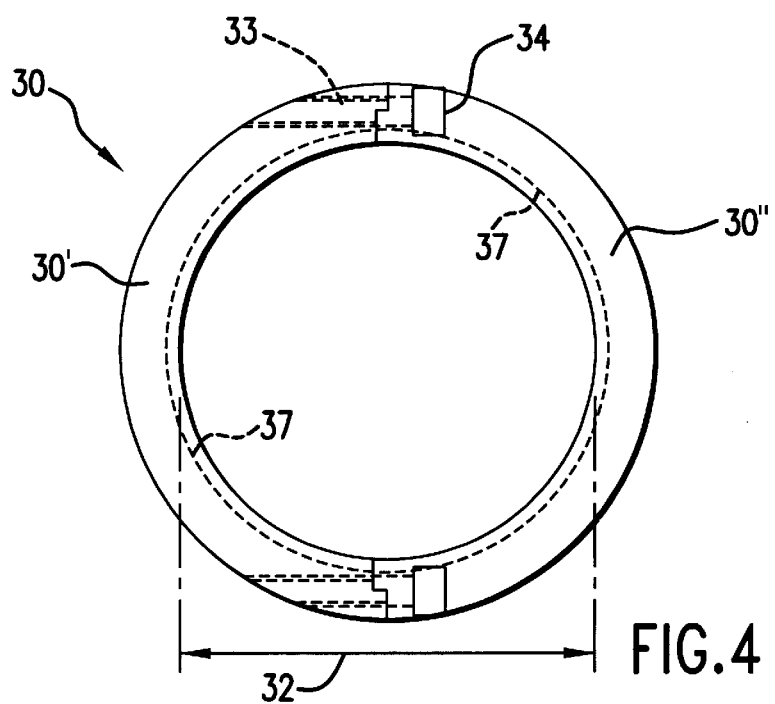
FIG. 4 is a front view of a shaft ring according to one preferred embodiment of this invention.

Seal assembly further includes shaft ring 30 positioned on rotatable shaft 10. Shaft ring 30, shown in FIGS. 1 and 4, has inner diameter 32 approximately equal to or slightly greater than outer diameter 12 of rotatable shaft 10. Like insert retainer 20, shaft ring 30 is constructed from stainless steel or similar material and preferably comprises two shaft ring halves 30', 30" that are connected with respect to each other with shaft ring screws 34 through shaft ring bores 33, as shown in FIG. 4.

Shaft ring 30 is connected to rotatable shaft 10 so that shaft ring 30 is rotatable with rotatable shaft 10. Shaft ring 30 is preferably connected to rotatable shaft 10 directly adjacent the wall of vessel 8. Shaft ring 30 is preferably rotatably positioned entirely within insert retainer 20. Shaft ring 30 does not directly contact insert retainer 20 within seal assembly 1.

In one preferred embodiment of this invention, shaft ring 30 further comprises shaft ring groove 37 positioned circumferentially around inner diameter 32 of shaft ring 30. Shaft ring groove 37 is preferably a shallow channel positioned toward one end of shaft ring 30. Shaft ring groove 37 preferably accommodates shaft ring seal 35 positioned around inner diameter 32 of shaft ring 30. Shaft ring seal 35 may comprise an O-ring cord that is laid around shaft ring groove 37. O-ring cord is constructed from a fluorinated rubber such as Viton®, or other temperature and chemical resistant sealing material known to those having ordinary skill in the art.

Shaft ring seal 35 preferably creates a sealing engagement between inner diameter 32 of shaft ring 30 and outer diameter of rotatable shaft 10. Alternatively, depending upon the application, shaft ring 30 may not include shaft ring seal 35.

Figure 5:
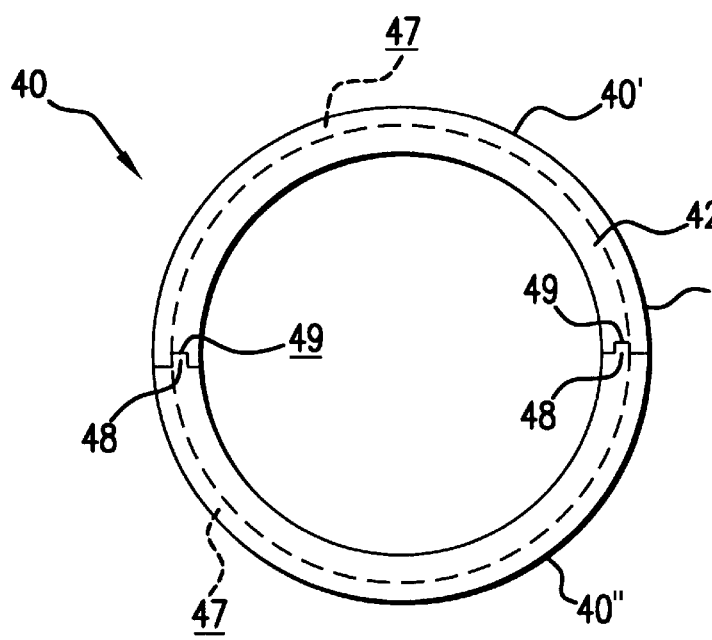
FIG. 5 is a front view of an insert according to one preferred embodiment of this invention.
Figure 6:
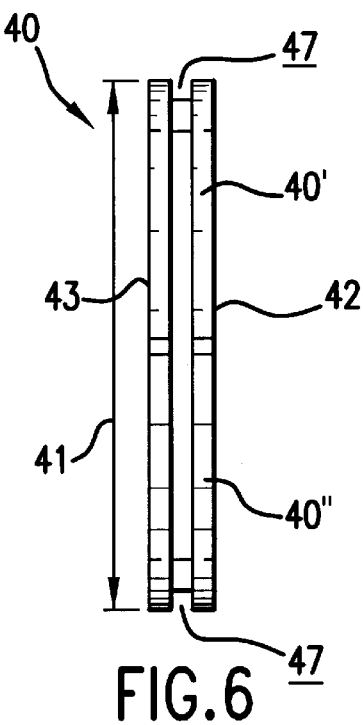
FIG. 6 is a side view of the insert shown in FIG. 5.

As shown in FIGS. 1, 5 and 6, seal assembly 1 further includes insert 40. Insert 40 is preferably constructed from Teflon® (polytetrafluoroethylene) or other similar material known to those having ordinary skill in the art. Like the other components discussed above, insert 40 preferably comprises two separable insert halves 40', 40". Insert 40 further includes inner face 42 that in an assembled seal assembly faces toward vessel 8 and outer face 43 that in an assembled seal assembly 1 faces away from vessel 8. Outer diameter 41 of insert 40 is approximately equal or slightly less than inner diameter 23 of insert retainer 20.

In one preferred embodiment of this invention, shown in FIGS. 5 and 6, insert 40 further includes insert groove 47 positioned circumferentially around insert 40. Insert groove 47 preferably accommodates sealing member 45. Sealing member 45 may comprise an O-ring cord, similar to shaft ring seal 35, laid around insert groove 47. Alternatively, insert 40 may not include insert groove 47 and/or sealing member 45.

In one preferred embodiment of this invention, shown in FIG. 5, two separable insert halves 40', 40" are joined through axial notch 48 and axial groove 49 positioned at an interface between two separable insert halves 40', 40". Axial notch 48 and axial groove 49 maintain a fixed radial position of separable insert halves 40', 40" with respect to each other. In addition, the axial arrangement of axial notch 48 and axial groove 49 in combination with sealing member 45 around insert 40, help maintain an effective seal in seal assembly 1.

Insert 40, and specifically inner face 42 is biased against shaft ring 30 and seated at least partially within insert retainer 20. In one preferred embodiment of this invention, insert 40 is positioned entirely within insert retainer 20. Sealing member 45 in insert 40 creates a sealed relationship between insert 40 and insert retainer 20. Retainer assembly 80 is preferably positioned adjacent insert 40 and maintains a fixed position of insert 40 with respect to shaft ring 30.

According to one preferred embodiment of this invention and as shown in FIG. 1, retainer assembly 80 includes bias plate 50, retainer plate 60 and bias members 70. Retainer assembly 80 is preferably designed to maintain a fixed position of insert 40 with respect to shaft ring 30 and in addition minimize wear of insert 40 and other components within seal assembly 1.

As shown in FIG. 1, bias plate 50 has insert surface 53 and retainer surface 55 opposite insert surface 53. Bias plate 50 is divided into separable bias plate halves 50', 50" that are preferably connected with hinge 52. Bias plate 50 is preferably constructed from a thin piece of material having inner and outer diameters that approximately coincide with inner and outer diameters of insert 40. Insert surface 53 of bias plate 50 is preferably positioned against insert 40. Preferably, bias plate 50 is biased against insert 40.

Figure 7:
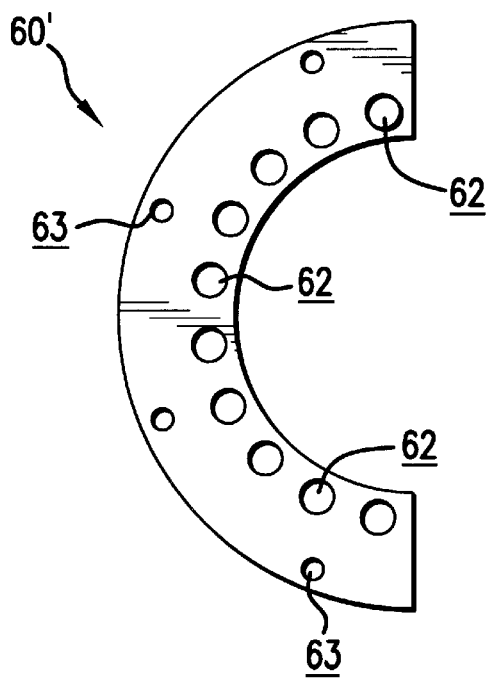
FIG. 7 is a front view of one half of a retainer plate according to one preferred embodiment of this invention.

Retainer assembly 80 further comprises retainer plate 60. As shown in FIGS. 1 and 7, retainer plate 60 is separable into two separable retainer plate halves 60', 60". In one preferred embodiment of this invention, retainer plate 60 includes a plurality of bias member apertures 62 spaced around an inner perimeter of retainer plate 60. Retainer plate 60 preferably further includes a plurality of retainer apertures 63 spaced around an outer perimeter of retainer plate 60. Retainer plate 60 is preferably attached to insert retainer 20 with a plurality of retainer screws 65 positioned through retainer apertures 63 and threadedly mounted with respect to retainer plate mounting bores 28. Spacers 75 are preferably positioned around retainer screws 65 between retainer plate 60 and insert retainer 20.

According to one preferred embodiment of this invention, a plurality of bias members 70 are positioned through retainer plate 60 and biased against the bias plate 50.

Specifically, bias members 70 are preferably positioned through bias member apertures 62 in retainer plate 60 and biased against retainer surface 55 of bias plate 50. Bias members 70 may comprise spring loaded screws that exert a bias force against bias plate 50, which bias force is then translated from bias plate 50 to insert 40. Therefore, as a result of the bias force exerted on bias plate 50, insert 40 is biased against shaft ring 30.

Vessels 8 such as mixers, specifically horizontal vacuum mixers, may generate internal vacuums of up to approximately 30". Additionally, rotatable shaft 10 may rotate in excess of 3600 revolutions per minute. Seal apparatus 1 according to this invention is effective for either of the above described conditions. As a result of the described rotation of rotatable shaft, shaft ring 30 rotates correspondingly in contact with insert 40. Therefore, inner face 42 of insert 40 may wear along contact surfaces with shaft ring 30. As such wear occurs, insert 40 remains in contact with shaft ring 30 because of the bias force exerted by bias members 70 indirectly upon insert 40. Bias plate 50 functions as a buffer between such bias force and insert 40.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of the invention.

I claim:

1. An apparatus for providing sealing engagement between a vessel and a rotatable shaft extending through a wall of the vessel, the apparatus comprising:

an insert retainer mounted to the vessel;

a shaft ring having an inner diameter approximately equal to an outer diameter of the rotatable shaft, the shaft ring connected to the rotatable shaft and rotatably positioned within the insert retainer;

an insert positioned against the shaft ring and at least partially within the insert retainer, the insert having an inner face and an outer face;

a sealing member positioned between the insert and the insert retainer;

a bias plate having an insert surface positioned along the outer face of the insert and a retainer surface positioned opposite the insert surface;

a retainer plate positioned adjacent the retainer surface of the bias plate, the retainer plate connected with respect to the insert retainer; and a plurality of bias members positioned through the retainer plate and biased against the bias plate.

2. The apparatus of claim 1 further comprising a plurality of retainer screws connecting the retainer plate with respect to the insert retainer.

3. The apparatus of claim 1 wherein the sealing member comprises an O-ring cord positioned around the insert.

4. The apparatus of claim 1 further comprising a shaft ring seal positioned around the inner diameter of the shaft ring.

5. The apparatus of claim 1 wherein each of the insert retainer, the shaft ring, the insert and the retainer plate comprise two separable halves.

6. The apparatus of claim 1 wherein the insert has an outer diameter approximately equal to an inner diameter of the insert retainer.

7. The apparatus of claim 1 wherein the shaft ring further comprises a shaft ring groove positioned circumferentially around the inner diameter of the shaft ring.

8. The apparatus of claim 1 wherein the insert further comprises an insert groove positioned circumferentially around an outer diameter of the insert.

9. An apparatus for providing sealing engagement between a vessel and a rotatable shaft extending through a wall of the vessel, the apparatus comprising:

an insert retainer mounted to the vessel;

a shaft ring having an inner diameter approximately equal to an outer diameter of the rotatable shaft, the shaft ring connected to the rotatable shaft and rotatably positioned within the insert retainer;

an insert positioned against the shaft ring and at least partially within the insert retainer, the insert having an inner face and an outer face;

a sealing member positioned between the insert and the insert retainer;

a bias plate having an insert surface positioned along the outer face of the insert and a retainer surface positioned opposite the insert surface; and a retainer plate positioned adjacent the retainer surface of the bias plate, the retainer plate connected with respect to the insert retainer and having a plurality of bias member apertures positioned circumferentially around the retainer plate.

10. An apparatus for providing sealing engagement between a vessel and a rotatable shaft extending through a wall of the vessel, the apparatus comprising:

an insert retainer connected with respect to the vessel;

a shaft ring having an inner diameter equal to an outer diameter of the rotatable shaft, the shaft ring connected to the rotatable shaft and rotatably positioned within the insert retainer;

an insert biased against the shaft ring, the insert seated at least partially within the insert retainer and comprising two separable halves, wherein at least one of the separable halves of the insert further including an axial groove positioned at an interface between the two separable halves of the insert;

a sealing member positioned between the insert and the insert retainer; and a retainer assembly positioned adjacent the insert, the retainer assembly maintaining a fixed position of the insert with respect to the insert retainer.

11. The apparatus of claim 10 wherein the retainer assembly comprises:

a bias plate having an insert surface positioned against the insert and a retainer surface positioned opposite the insert surface; and a retainer plate positioned against the retainer surface of the bias plate, the retainer plate connected with respect to the insert retainer.

12. The apparatus of claim 10 further comprising a shaft ring seal positioned around the inner diameter of the shaft ring.

13. An apparatus for providing sealing engagement between a vessel and a rotatable shaft extending through a wall of the vessel, the apparatus comprising:

an insert retainer connected with respect to the vessel;

a shaft ring having an inner diameter equal to an outer diameter of the rotatable shaft, the shaft ring connected to the rotatable shaft and rotatably positioned within the insert retainer; and an insert biased against the shaft ring, the insert seated at least partially within the insert retainer, the insert having two separable halves, at least one of the separable halves of the insert including an axial groove positioned at an interface between the two separable halves of the insert.

14. The apparatus of claim 13 further comprising a retainer assembly positioned adjacent the insert, the retainer assembly maintaining a fixed position of the insert with respect to the shaft ring.

15. The apparatus of claim 14 wherein the retainer assembly comprises:

a bias plate having an insert surface positioned against the insert and a retainer surface positioned opposite the insert surface; and a retainer plate biased against the retainer surface of the bias plate, the retainer plate connected with respect to the insert retainer.

16. The apparatus of claim 10 further comprising a sealing member positioned between the insert and the insert retainer.

17. The apparatus of claim 10 further comprising a shaft ring seal positioned around the inner diameter of the shaft ring.

* * * * *